Aug. 28, 1962 R. P. MAZZAGATTI 3,051,927
TRANSDUCER ASSEMBLIES
Original Filed July 2, 1956 2 Sheets-Sheet 1
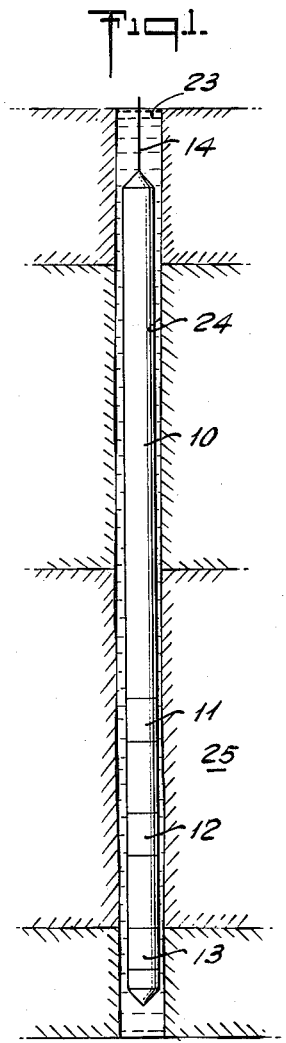
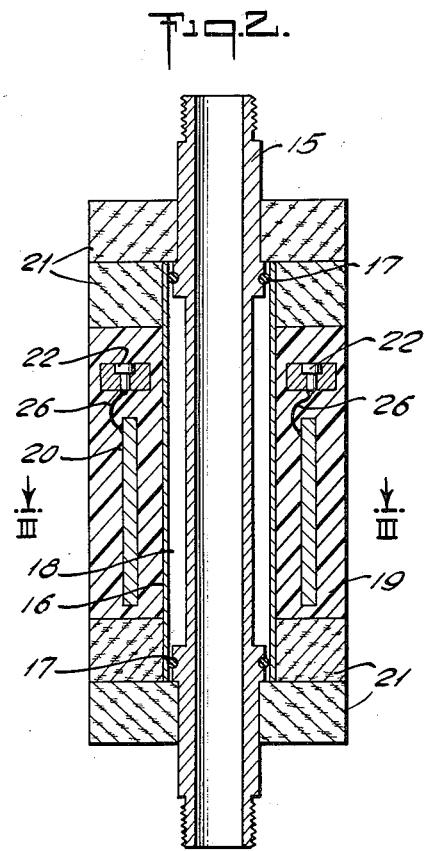
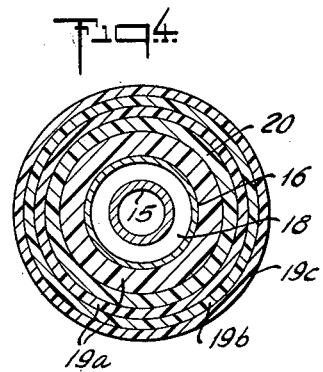
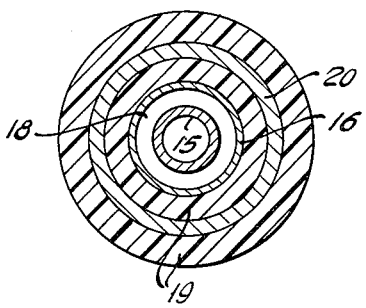

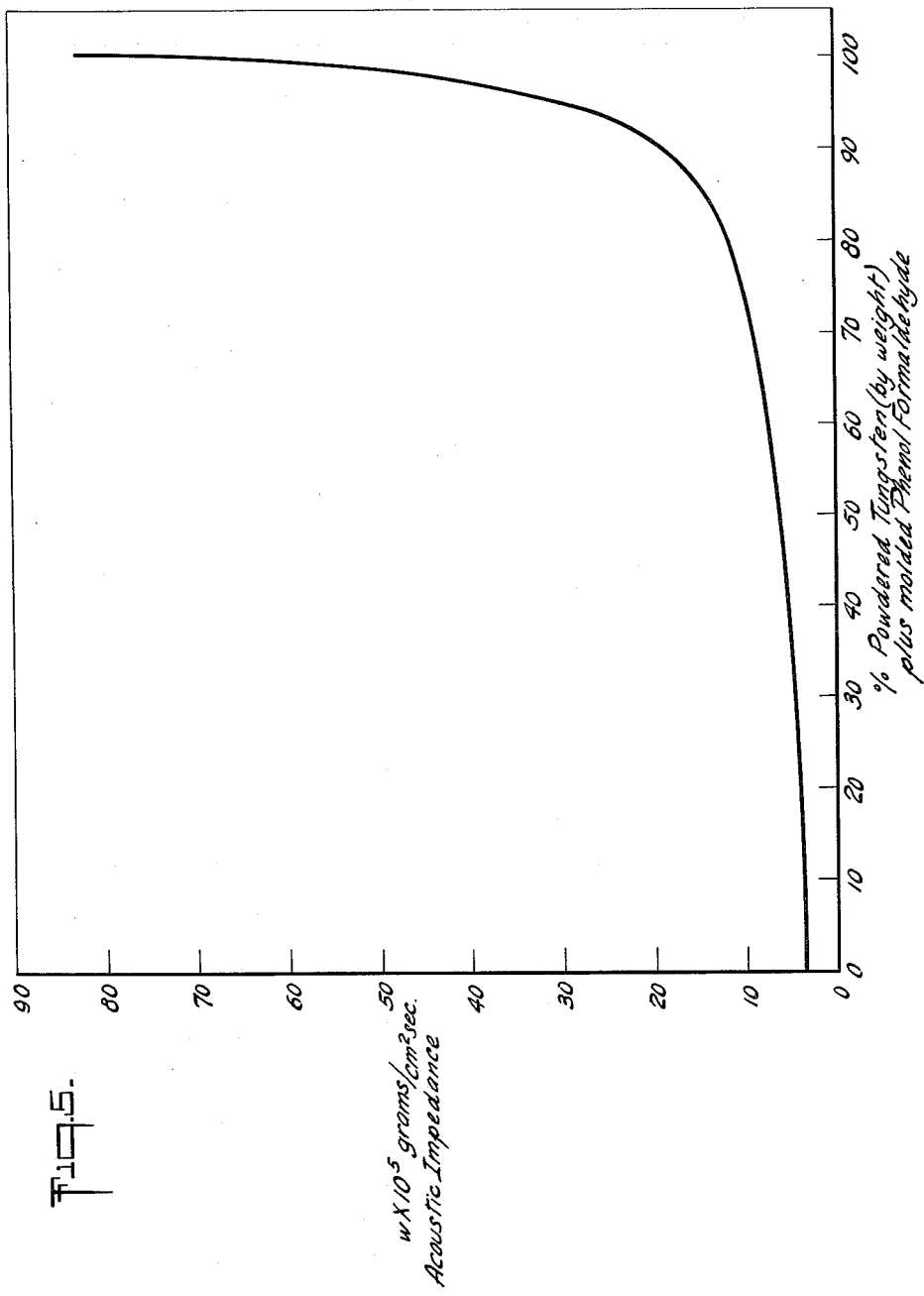

United States Patent Office 3,051,927
Patented Aug. 28, 1962

3,051,927
TRANSDUCER ASSEMBLIES
Roy P. Mazzagatti, Bellaire, Tex., assignor to Texaco Inc., New York, N.Y., a corporation of Delaware
Continuation of application Ser. No. 595,432, July 2, 1956. This application Aug. 4, 1960, Ser. No. 47,559
10 Claims. (Cl. 340—17)

This invention relates to electro-mechanical transducer assemblies and, more particularly, to electro-mechanical transducer assemblies for converting electric energy into mechanical or acoustic energy, and vice versa, in acoustical velocity logging systems.

It has been proposed heretofore to survey wells or earth bores by generating sound or acoustic waves, and preferably ultrasonic waves, at a given level in a well and then measuring the velocity of sound propagation through the surrounding earth strata thereby to determine the acoustic properties of the strata. The velocity of sound propagation may be measured at a number of different levels so as to ascertain the variations in acoustic properties of the strata throughout the entire depth of the well and more preferably the variations in the acoustic properties of the strata may be ascertained by continuously logging the sound velocity. The velocity of sound through a given stratum may be determined by measuring the time difference or lapse between the instant of transmission and the instant of reception of a sound wave or pulse. Thus, if the transmitter or transmitting transducer and receptor or receiving transducer are separated by a known distance $d$, then $$v = \frac{d}{t}$$

where $v$ is equal to the velocity of sound propagation in the given stratum, $d$ is equal to the distance of travel of the sound wave and $t$ is equal to the time of travel of the wave. As indicated by the foregoing equation, the velocity of sound propagation is inversely proportional to the time of travel.

The velocity of sound propagated through a given stratum surrounding an earth bore may also be determined by transmitting a pulse of acoustic energy at a given level and then measuring the time differential between the instant of detection of the pulse at each of two receiving transducers spaced a fixed distance apart in the earth bore, the receiving transducers being spaced from the transmitter in a manner such that a transmitted sound wave while traveling in one direction passes both receiving transducers.

In U.S. Patent 2,931,455, issued April 5, 1960 as a result of application Serial No. 574,844, filed March 29, 1956, which is a continuation of U.S. patent application having Serial No. 157,495, filed April 22, 1950, now abandoned, there is described an acoustical velocity logging system which includes a transducer for transmitting acoustic energy and two transducers for receiving and converting the transmitted acoustic energy into corresponding electric waves or pulses which are applied to a time-measuring circuit for determining the time differential between the instants of detection of a given pulse of acoustic energy at the two receiving transducers. This velocity logging system is provided with a tool having a unitary structure which maintains the transducers at fixed distances from each other in the earth bore. The exterior surface of the tool has the form of an elongated cylindrical closed shell of relatively small diameter such that it can be lowered or raised readily within the earth bore. The tool is attached to a conductor cable for suspending or supporting it in the earth bore and for passing electrical energy to and from that portion of the electrical circuitry of the system contained within the tool. Each transducer is mounted in the tool so that it can be acoustically coupled to the earth strata surrounding the well through the fluid or mud contained therein.

Previous efforts toward design and construction of instruments for use in acoustic velocity logging have not incorporated into the ultrasonic transmitter or receiver assemblies suitable means for providing a high degree of acoustic coupling between the transducer elements, for example, piezo-electric elements, and the well or borehole fluid. The lack of proper acoustic coupling results in a considerable loss of signal energy between transducers and the well fluid and accordingly little or no signal energy is available at the receivers.

Although the desired transmission path for the acoustic waves in an acoustic velocity logging system is from the transmitting transducer through the fluid in the well or borehole, then through the formation surrounding the borehole and again through the borehole fluid to the receiving transducers, other transmission paths must be considered when designing the acoustic system. One of the other transmission paths which should be given some consideration is the path from the transmitting transducer directly through the borehole fluid to the receiving transducer. The borehole fluid transmission path can be ignored when working below the weathered layer of the earth by spacing the receiving transducers by at least a minimum distance from the transmitting transducers since the acoustic velocity logging systems are generally responsive only to first arrival pulses at the receiving transducers and since the acoustic velocity in the borehole fluid, such as water, is usually not greater than 5,000 feet per second whereas the acoustic velocity in the subsurface formations is generally considerably higher than 5,000 feet per second. Another transmission path which must be considered is the path directly through the mounting or support member of the tool. This member is used to maintain a fixed distance between the transducer assemblies as well as to mount or support within the tool the electrical components including the transducer assemblies. In attaching the transducer element of the transducer assemblies to the mounting or support member, it is necessary that means be employed to eliminate the transmission of ultrasonic energy directly from the transmitter assembly to the receiver assembly through the support member since the acoustic velocity through the support member, which may be a rigid metal tube or rod, is considerably higher than the acoustic velocity through many subsurface formations. Previous efforts to accomplish this desired effect have resulted in cumbersome and inefficient mechanical arrangements, such as disposing between sections of support members of transducer assemblies a substantial length of resilient material for example, rubber, having a diameter equal to that of the tool.

It is an object of this invention to provide an improved acoustic velocity logging system wherein the spacing between the transmitting transducer assembly and a receiving transducer assembly may be less than that of prior art systems.

An important object of this invention is to provide an improved electro-mechanical transducer assembly.

It is also an object of this invention to provide a transducer assembly for use in acoustical velocity logging systems which efficiently transmits acoustical energy in a given direction but provides a high impedance to the acoustic energy in other directions.

It is another object of this invention to provide in an acoustical velocity logging system a transducer assembly which includes a medium having an impedance which acoustically matches the impedances of two different adjacent media.

It is a further object of this invention to provide a transducer assembly for use in acoustical velocity logging systems which is provided with a medium having an acoustic impedance matching the transducer element and the well fluid.

It is still another object of this invention to provide a transducer assembly for use in an acoustical velocity logging system which is provided with two mediums having mismatched acoustic impedance disposed between the transducer element of the assembly and the fluid of the borehole.

It is a still further object of this invention to provide in acoustic velocity logging systems a transducer assembly in which an interface between two mediums having a high ratio of specific acoustic impedances is disposed between the transducer element and the support member thereof.

Yet another object of this invention is to provide a transducer assembly for use in acoustic velocity logging systems which is of a simple construction yet more efficient than prior art transducer assemblies.

In accordance with the present invention there is provided in an acoustical velocity logging system an electromechanical transducer assembly which includes a transducer element, a coupling medium disposed between and in contact with the transducer element and the borehole fluid and means including an interface between two mediums having a high ratio of specific acoustic impedances disposed between the transducer element and the support member of the assembly.

The transducer assembly of the present invention provides a stronger and clearer acoustic signal at the receiving transducers by utilizing improved acoustic coupling means between the well fluid and each of the transducer elements of a logging system while decoupling each of the transducer elements from the tool housing or support member.

When ultrasonic waves travel from one medium into another through a plane boundary perpendicular to the direction of propagation of the waves, the reflectivity of the separating plane, that is the ratio of the reflected to incident ultrasonic energy is dependent upon the "reflective index" $m = w_1/w_2$, where $w_1$ is equal to $\rho_1 v_1$ and $w_2$ is equal to $\rho_2 v_2$. The product $\rho v$ is called the "acoustic resistivity" or "specific acoustic impedance" of a material and $\rho$ represents the specific gravity and $v$ the velocity of ultrasonic energy in the medium in question.

For conditions of maximum ultrasonic energy transfer at a boundary of two media as qualified above, it is necessary that acoustic impedance matching be accomplished.

Impedances can be matched by keeping them equal; however, it is obvious that this situation will seldom occur. Accordingly, it is necessary to provide an additional medium between the two media of interest that has an impedance which is the geometric mean of the impedances of the two media of interest. Better results may be accomplished by interposing $n$ number of such media each having an impedance that is the mean of that of its two adjacent media. For these interposing mediums say $x$ and $y$ the geometric mean acoustic impedances between $w_1$ and $w_2$ are $x = (w_1^2 x)^{1/3}$ and $y = (y w_2^2)^{1/3}$. For three interposing media $x$, $y$ and $z$ the geometric mean acoustic impedance between $w_1$ and $w_2$ are $x = (w_1^3 w_2)^{1/4}$, $y = (w_1 w_2)^{1/2}$ and $z = (w_1 w_2^3)^{1/4}$.

The means for acoustically decoupling the transducer element from the support member may include an air-metal boundary disposed between the transducer element and the housing or support member which is formed by two sufficiently mismatched mediums. Accordingly, very little ultrasonic energy is transmitted from the transmitting transducer element to the housing and likewise very little ultrasonic energy is transmitted from the housing to the receiving transducer element.

For a more complete understanding of the present invention reference may now be had to the following description taken in conjunction with the accompanying drawings wherein:

FIG. 1 illustrates the tool of the acoustic velocity logging system positioned in a well or borehole;

FIG. 2 is a cross-sectional view of the transducer assembly taken through the longitudinal axis thereof;

FIG. 3 is a cross-sectional view of the transducer assembly taken along the line III—III of FIG. 2;

FIG. 4 is a cross-sectional view of a transducer assembly having three coupling mediums disposed between the transducer element and the well fluid;

FIG. 5 shows a graph of the specific acoustic impedance of molded phenol formaldehyde loaded with powdered tungsten as a function of percent tungsten contained.

Referring to FIG. 1 in more detail there is illustrated an acoustic velocity logging tool disposed in fluid 23 contained in a well or borehole 24 adjacent to subsurface formation 25. The tool comprises an electronic section 10, a first transducer assembly 11 which may for example be a transmitting transducer and transducer assemblies 12 and 13 which may, for example, be receiving transducer assemblies. The section 10 may include receiver amplifiers and a generator for supplying electric pulses to the transmitting transducer assembly of the tool. To the tool is connected a cable 14 which is used to support the tool within the well or borehole and to transfer electric energy between the tool and equipment located at the earth's surface.

FIG. 2 illustrates an electro-mechanical transducer assembly in accordance with the present invention which may be used in the tool, for example, for transducer assembly 11, 12 or 13. This assembly comprises a mounting or support member 15, a tubular metal sleeve 16, preferably made of brass, disposed concentrically around the support member 15 and spaced therefrom by relatively narrow resilient spacing or sealing members, for example, O-rings 17 disposed within recesses in the support member 15, located near each end of sleeve 16. The support member 15, the sleeve 16 and the O-rings 17 cooperate to entrap an air space 18 between the support member and sleeve. A coupling member 19, which may readily consist essentially of polymethyl methacrylate having a generally hollow cylindrical form, is mounted on the metal sleeve 16. A transducer element 20, for example a piezoelectric element is imbedded and disposed concentrically within the coupling medium 19. Cork thrust washers 21 are disposed around the support member 15 at each end of the coupling medium 19. Terminals 22 and lead-in wires 26 are provided for making electrical connections to the transducer element of the assembly.

FIG. 3 illustrates a cross-sectional view of the transducer assembly taken along the line III—III of FIG. 2, corresponding elements being identified by similar numerals.

FIG. 4 illustrates a cross-sectional view of a transducer assembly similar to that illustrated in FIGS. 2 and 3 but employing three coupling mediums, 19a, 19b and 19c in place of the one coupling medium 19.

In the operation of the acoustic velocity logging system illustrated in FIG. 1, an electric pulse derived from the electrical circuitry housed in section 10 is applied to the transmitting transducer assembly to produce an acoustic pulse which is transmitted from the transmitting transducer assembly through the mud 23 in the well or borehole 24 to the formation 25 surrounding the well in the vicinity of the transducer assembly. The acoustic pulse travels through the formation 25 to a point in the wall of the well 24 in the proximity of the receiving transducer 12 where it reenters the mud 23 and after passing therethrough is detected by receiving transducer 12. The acoustic pulse in formation 25 also passes therethrough down to a point in the wall of the well 24 in the proximity of the receiving transducer assembly 13 where it reenters the mud and passes therethrough to the receiving transducer assembly 13. Electric power may be supplied to the electrical circuitry housed in section 10 from apparatus located at the earth's surface through the cable 14 and the electric pulses corresponding to the acoustic pulses detected by receiving transducer assemblies 12 and 13 respectively may be transmitted after being suitably amplified in section 10 to the earth's surface via cable 14 which may include one or more pairs of wires.

When the electric pulse is applied to the transmitting transducer element 20 through the electrodes 22 and lead-in wires 26 an acoustic pulse is created which is transmitted from the transducer element radially outwardly through the coupling medium 19 into the borehole fluid or mud 23. The coupling medium 19 is composed of a material having a value of specific acoustic impedance substantially equal to the geometric mean of the impedance of the transducer element 20 and the impedance of the mud 23. The transducer element 20 also transmits an acoustic pulse radially inwardly toward the support member 15. In order to acoustically insulate this member from the acoustic pulse created at the surface of the transmitting transducer element, the air space 18 and the metal sleeve 16 which may be made of brass are provided. The combination of the metal sleeve 16 and the air space 18 provides an interface or boundary between the transmitting transducer element 20 and the support member 15 which is not conducive to ultrasonic energy transmission due to the mismatching of the specific acoustic impedances of the two materials since the specific impedance of brass is equal to $29 \times 10^5$ and that of air is equal to 41.3 (grams) (cm.)/(cm.$^3$) (sec.), thus providing a ratio of the specific acoustic impedance of brass to air of approximately $7 \times 10^4$. Accordingly, very little acoustic or ultrasonc energy is transmitted from the transmitting transducer element to the support member and likewise very little sound or ultrasonic energy can be transmitted from the support member to the receiving transducer elements. Additional interfaces between two acoustically mismatched mediums may be included to further attenuate the acoustic pulses.

As stated above, after passing through the mud 23, the acoustic pulse is transmitted through the formation 25 and then to the receiving transducer assemblies 12 and 13, usually after again passing through the mud 23. Upon arrival of the pulse at a receiving transducer assembly the pulse first passes through the coupling medium 19 then strikes the receiving transducer element where it is converted into a corresponding electric pulse.

The specific acoustic impedance of a transducer element, for example a well-known type of barium titanate transducer element, which may be used in the assembly of the present invention is approximately $30 \times 10^5$ grams/cm.$^2$ sec. For acoustically matching the barium titanate transducer element to a well fluid which consists of water having a specific acoustic impedance approximately equal to $1.43 \times 10^5$ grams/cm.$^2$ sec. the desired interposing medium in accordance with the teachings of this invention must be of an acoustic impedance $$x = \{(30 \times 10^5)(1.43 \times 10^5)\}^{\frac{1}{2}} = 6.34 \times 10^5$$

grams/cm.$^2$ sec. After having determined the desired acoustic impedance of a material for use as a coupling medium a suitable material to provide the desired impedance can be obtained by, for example, mixing a proper amount of powdered tungsten into phenol formaldehyde. FIG. 5 shows a graph which indicates the specific acoustic impedances for molded phenol formaldehyde loaded with powdered tungsten as a function of the percent of tungsten (by weight) contained therein. With the use of this graph a large range of acoustic impedances may readily be obtained. For a comprehensive list of various materials and their acoustic characteristics, reference may be had to "Elements of Acoustical Engineering," by Harry F. Olson, pages 8 to 10, second edition, third printing, 1947, published by D. Van Nostrand Co., Inc.

It can readily be seen that the transducer assemblies of the present invention provide optimum acoustic matching of transmitting and receiving transducer elements to the well fluid whereby a more desirable condition prevails for the transmission and detection of ultrasonic energy within a well or borehole which provides an improved acoustic velocity logging system.

This application is a continuation of application Serial No. 595,432, filed July 2, 1956, now abandoned.

Obviously many modifications and variations of the invention as hereinabove set forth may be made without departing from the spirit and scope thereof and therefore only such limitations should be imposed as are indicated in the appended claims.

I claim:

1. In a tool of an acoustic velocity well logging system wherein acoustic energy is transferred between the tool and a given medium having a characteristic acoustic impedance substantially like that of water, said tool including at least one transmitting transducer and at least one receiving transducer, the improvement wherein at least one of said transducers is included in a transducer assembly comprising a transducer element having a hollow cylindrical form, a rigid metallic support member disposed coaxially within said element, a coupling medium having an acoustic impedance having a value substantially equal to the geometric mean of the impedances of said transducer element and said given medium and without the range of acoustic impedances between that of said member and said element, said transducer element being imbedded in said coupling medium so that a substantially uniform portion of said coupling medium is disposed between said transducer element and said given medium and acoustic decoupling means disposed between said transducer element and said rigid support member for acoustically decoupling said transducer element from said support member, said acoustic decoupling means comprising an interface defined by a tubular metallic sleeve closely fitted within said hollow cylindrical transducer element in contact with the coupling medium in which said transducer element is imbedded and an air space intermediate said sleeve and said rigid metallic support member, the ratio of the specific acoustic impedances of the two materials defining said interface being of the order of $7 \times 10^4$.

2. A transducer assembly as set forth in claim 1 wherein said coupling medium is a molded resin.

3. A transducer assembly as set forth in claim 1 wherein said coupling medium is a molded resin with powdered tungsten imbedded therein.

4. A transducer assembly as set forth in claim 1 wherein said coupling medium is phenol formaldehyde.

5. A transducer assembly as set forth in claim 1 wherein said coupling medium is essentially polymethyl methacrylate.

6. In a tool of an acoustic velocity well logging system wherein acoustic energy is transferred between the tool and a given medium having a characteristic acoustic impedance substantially like that of water, said tool including at least one transmitting transducer and at least one receiving transducer, the improvement wherein at least one of said transducers is included in a transducer assembly comprising a transducer element having a hollow cylindrical form, a coupling medium having a hollow cylindrical form and having an acoustic impedance of a value substantially equal to the geometric mean of the acoustic impedance of said transducer element and of the acoustic impedance of said given medium, said transducer element being disposed coaxially and imbedded within said coupling medium so that a substantially uniform portion of said coupling medium is disposed between said transducer element and said given medium, a solid support member disposed coaxially within said coupling medium acoustic decoupling means disposed between said support member and said coupling, said acoustic decoupling means comprising an interface defined by first and second materials having a high ratio of specific acoustic impedances and being contiguous with each other to form an interface, the ratio of the specific acoustic impedances of the two materials defining said interface being of the order of $7 \times 10^4$.

7. In an acoustic velocity well logging system communicating with a given medium having a characteristic acoustic impedance substantially like that of water, a tool comprising an elongated rigid support member and at least two spaced apart electro-mechanical transducer assemblies mounted fixedly on said support member, at least one of said transducer assemblies being a transmitter assembly and at least one other of said transducer assemblies being a receiver assembly, each of said transducer assemblies comprising a tubular metal sleeve disposed concentrically around said support member, acoustic decoupling means comprising an interface defined by the inner surface of said tubular metal sleeve and a layer of air provided in contact with said sleeve between said support member and said sleeve, the ratio of the specific acoustic impedances of the two materials defining said interface being of the order of $7 \times 10^4$, a coupling medium disposed concentrically around and in contact with said sleeve, a hollow cylindrical transducer element imbedded within said coupling medium and disposed concentrically around said sleeve so that a substantially uniform portion of said coupling medium is disposed between said transducer element and said given medium and between said transducer element and said sleeve, said coupling medium having an impedance substantially equal to the geometric means of the impedances of said transducer element and said given medium.

8. A tool as set forth in claim 7 wherein the transducer element of at least one of said transducer assemblies is a piezoelectric element, said coupling medium is essentially polymethyl methacrylate, and said metal sleeve is made of brass.

9. In an acoustic velocity logging instrument including at least one transmitting transducer and at least one receiving transducer, the improvement wherein at least one of said transducers is included in an assembly comprising a support member, a tubular sleeve disposed concentrically around said support member, two O-rings, one of said O-rings being disposed between said sleeve and said support member at each end of said sleeve to space said sleeve from said member to provide a layer of air therebetween, the ratio of the specific acoustic impedances of the two materials defining the interface between said sleeve and said layer of air being of the order of $7 \times 10_4$, a hollow cylindrical coupling medium disposed concentrically around said sleeve, the inner surface of said coupling medium being in contact with said sleeve and the outer surface of said coupling medium being in contact with a given medium, and a hollow cylindrical transducer element disposed concentrically and imbedded entirely within said coupling medium, said coupling medium having an impedance substantially equal to the geometrical mean of the impedances of said transducer element and said given medium.

10. An electro-acoustic transducer assembly as set forth in claim 9 wherein said coupling medium is disposed on said tubular sleeve between said O-rings and which assembly further includes spacing washers disposed on said sleeve at each end of said coupling medium.

References Cited in the file of this patent

UNITED STATES PATENTS

| | | |
|---|---|---|
| 2,427,348 | Bond | Sept. 16, 1947 |
| 2,708,485 | Vogel | May 17, 1955 |
| 2,708,742 | Harris | May 17, 1955 |
| 2,762,032 | Vogel | Sept. 4, 1956 |